United States Patent
Sharifi Mehr

(10) Patent No.: US 10,769,045 B1
(45) Date of Patent: Sep. 8, 2020

(54) MEASURING EFFECTIVENESS OF INTRUSION DETECTION SYSTEMS USING CLONED COMPUTING RESOURCES

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/716,400

(22) Filed: Sep. 26, 2017

(51) Int. Cl.
| | |
|---|---|
| *G06F 9/44* | (2018.01) |
| *G06F 11/34* | (2006.01) |
| *G06F 21/57* | (2013.01) |
| *G06F 21/55* | (2013.01) |
| *G06F 21/53* | (2013.01) |
| *G06F 21/56* | (2013.01) |

(52) U.S. Cl.
CPC ........ *G06F 11/3457* (2013.01); *G06F 21/552* (2013.01); *G06F 21/577* (2013.01); *G06F 21/53* (2013.01); *G06F 21/56* (2013.01)

(58) Field of Classification Search
CPC ... G06F 11/3457; G06F 21/552; G06F 21/577
USPC ........................................................ 717/124
See application file for complete search history.

(56) References Cited

U.S. PATENT DOCUMENTS

| | | | | |
|---|---|---|---|---|
| 9,185,132 B1 * | 11/2015 | Gauvin | ............... | H04L 63/1441 |
| 10,333,953 B1 * | 6/2019 | Averbuch | ............ | H04L 63/1416 |
| 2003/0182582 A1 * | 9/2003 | Park | .................... | H04L 63/1433 726/25 |
| 2006/0253906 A1 * | 11/2006 | Rubin | .................... | H04L 63/20 726/23 |
| 2007/0113285 A1 * | 5/2007 | Flowers | ................ | G06F 21/552 726/23 |
| 2009/0083855 A1 * | 3/2009 | Apap | .................... | G06F 21/552 726/24 |
| 2010/0082513 A1 * | 4/2010 | Liu | ..................... | H04L 63/1458 706/46 |
| 2012/0260344 A1 * | 10/2012 | Maor | .................. | G06F 11/3688 726/25 |

(Continued)

OTHER PUBLICATIONS

Title:Metadata for anomaly-based security protocol attack deduction, author: T Leckie et al, published on 2004.*

(Continued)

*Primary Examiner* — Chameli Das
(74) *Attorney, Agent, or Firm* — Davis Wright Tremaine LLP

(57) ABSTRACT

A simulated attack service of a computing resource service provider generates a cloned computing resource environment on which a simulated attack is executed. The cloned computing resource environment may be based at least in part on a computing resource environment including a set of computing resources. The simulated attack service may execute the simulated attack by at least directing a simulated attack payload to the cloned computing resource environment based at least in part on a signature included in the simulated attack payload. A measure of the effectiveness of an intrusion detection system may then be generated based at least in part on threat analysis information generated by the intrusion detection system and the simulated attack payloads of the simulated attack.

20 Claims, 8 Drawing Sheets

(56) References Cited

U.S. PATENT DOCUMENTS

| | | | | |
|---|---|---|---|---|
| 2014/0337974 A1* | 11/2014 | Joshi | H04L 63/1425 | 726/23 |
| 2015/0082399 A1* | 3/2015 | Wu | G06F 21/6209 | 726/6 |
| 2015/0096036 A1* | 4/2015 | Beskrovny | G06F 21/577 | 726/25 |
| 2015/0309831 A1* | 10/2015 | Powers | H04L 63/1441 | 718/1 |
| 2015/0381649 A1* | 12/2015 | Schultz | H04L 63/1433 | 726/25 |
| 2016/0092348 A1* | 3/2016 | Straub | G06F 11/3684 | 717/124 |
| 2016/0182486 A1* | 6/2016 | Wu | G06F 21/6209 | 726/28 |
| 2016/0241574 A1* | 8/2016 | Kumar | H04L 63/12 | |
| 2016/0241582 A1* | 8/2016 | Boia | H04L 63/1433 | |
| 2016/0253254 A1* | 9/2016 | Krishnan | G06F 11/3612 | 717/124 |
| 2016/0285907 A1* | 9/2016 | Nguyen | H04L 63/1433 | |
| 2016/0323302 A1* | 11/2016 | Teixeira | H04L 63/1416 | |
| 2017/0034187 A1* | 2/2017 | Honig | G06N 20/00 | |
| 2017/0214702 A1* | 7/2017 | Moscovici | H04W 12/1205 | |
| 2017/0244744 A1* | 8/2017 | Key | H04L 63/1425 | |
| 2018/0077188 A1* | 3/2018 | Mandyam | H04L 63/1433 | |
| 2018/0191754 A1* | 7/2018 | Higbee | H04L 63/20 | |
| 2018/0192292 A1* | 7/2018 | Coney | H04W 12/08 | |
| 2018/0357422 A1* | 12/2018 | Telang | G06F 21/577 | |
| 2018/0375897 A1* | 12/2018 | Kawasaki | H04L 63/1491 | |
| 2019/0197244 A1* | 6/2019 | Fong | G06N 3/006 | |

OTHER PUBLICATIONS

Title: Sequence matching and learning in anomaly detection for computer security, author: T Lane et al, published on 1997.*

Title: A knowledge-based approach to intrusion detection modeling, author: S More et al, published on 2012.*

* cited by examiner

MEASURING EFFECTIVENESS OF INTRUSION DETECTION SYSTEMS USING CLONED COMPUTING RESOURCES

BACKGROUND

Maintaining the security of computer systems is an important and difficult problem. For a single computer system, system logs, firewalls, and other intrusion detection systems provide a certain level of security, but as computer systems and the attacks on them become more complex, detecting attacks on the system can become more difficult. For example, a complex computer system may include storage services, computing services, and virtual networking services that are shared across multiple customers as well as services and servers dedicated to individual customers. Attacks can be directed at any number of these systems, and a successful attack may be leveraged to compromise other connected services and subsystems. Therefore, detecting such attacks early is an important step in mitigating and preventing severe system compromise.

In addition, it is difficult to measure the effectiveness of various systems, such as intrusion detection systems, at preventing or mitigating attacks. Furthermore, attackers are continually developing new attack patterns to circumvent security measures. For example, attackers are continuously searching for exploits to launch various attacks, such as a zero day attack, that are not detected by an intrusion detection system. These zero day attacks/vulnerabilities refer to gaps in the security of a particular application that is unknown to the developer and therefore may not be secured or accounted for by the developer. Therefore, measuring the effectiveness of intrusion detection systems and other security measures is important to the development and improvement of those security measures.

BRIEF DESCRIPTION OF THE DRAWINGS

Various techniques will be described with reference to the drawings, in which.

DETAILED DESCRIPTION

Figure 1:
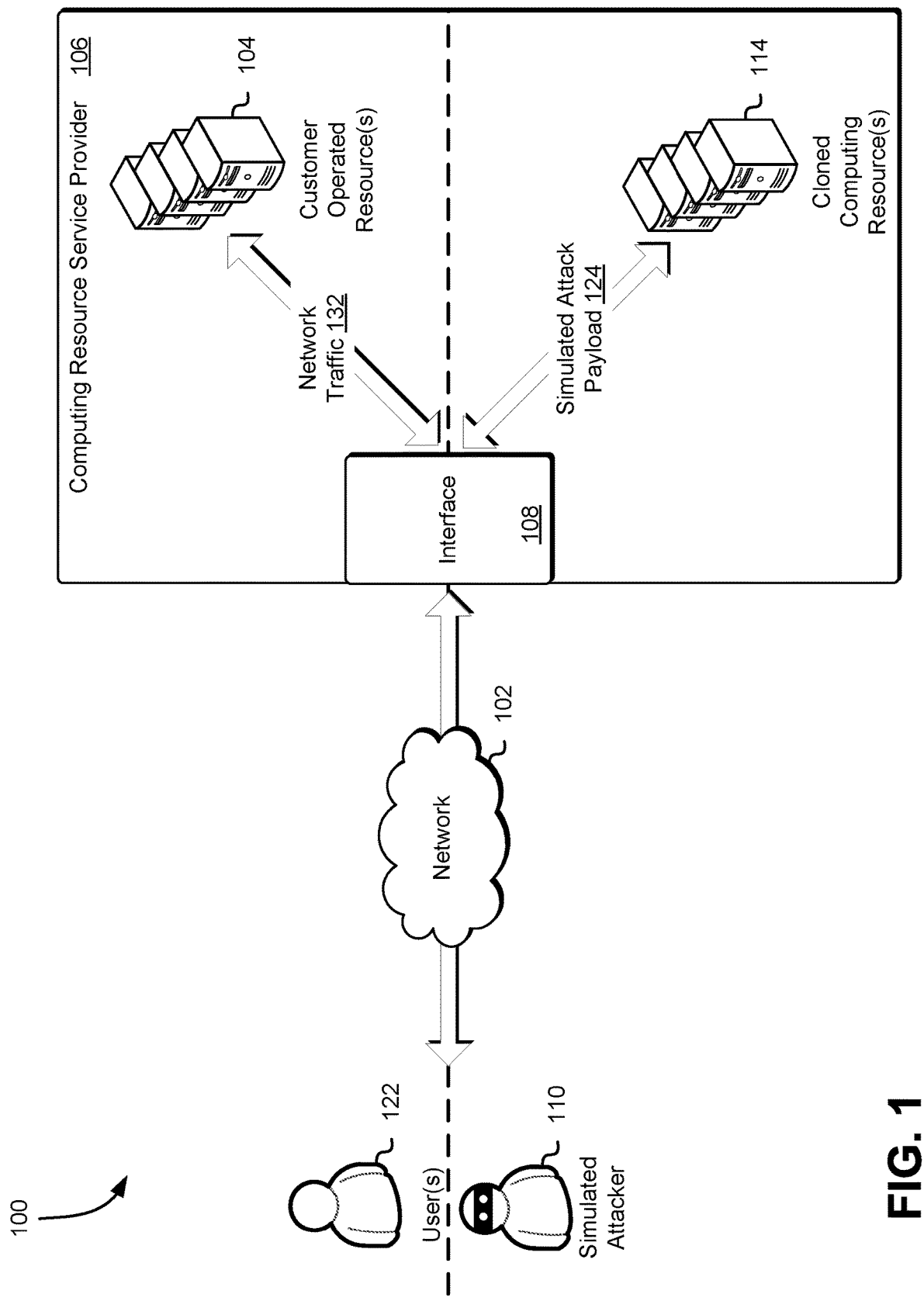
FIG. 1 illustrates an environment in which simulated attack payloads generated by a simulated attacker are directed to a cloned computing resource environment in accordance with an embodiment.

The present disclosure relates to effective techniques for determining or otherwise measuring the effectiveness of intrusion detection systems, threat analysis systems, anomaly detection systems, and other security measures implemented to protect one or more computer systems including distributed computing systems. In various examples described in greater detail below, a computing resource service provider provides a threat analysis service that monitors the operation of a customer computing resource environment. The customer computing resource environment may include client computer systems, virtualized computing resources, computer servers, data storage resources, authentication resources, encryption resources, network devices and appliances, or other computing resources operated by the customer. In addition, the customer computing resource environment may include computing resources provided by the customer and/or third parties, such as the computing resource service provider.

Furthermore, the techniques described in greater detail below may be used in connection with various other computing resource environments including a computing resource service environment. In one example, a virtual computing service provided by the computing resource service provider is implemented as a distributed computing resource environment including a plurality of computer servers, data storage device, and networking resources. In this example, the distributed computing resource environment may be protected by any number of security measures, such as a threat analysis service. To protect these environments, the threat analysis service obtains diagnostic information and other information associated with the environments from log entries, event logs, trace files, and other sources of diagnostic information provided by the various computing resources executing within the environments. To maintain the security of these environments as attack and attackers become more sophisticated, in some examples, tests are conducted to ensure that anomalies are identified and mitigate as appropriate. These tests can be generated by a simulated attack service which, in various examples, generates a simulated attack payload that includes a signature or other indicator that the simulated attack payload was generated by the simulated attack service. The signature may include various mechanisms for indicating that a particular simulated attack payload is associated with a particular simulated attack and should be directed to a cloned computing resource environment.

The simulated attack and/or simulated attack payload, as described in greater detail below, can be generated to simulate various attacks such as active infiltration attacks, attacks originating from compromised services within a trusted network, sabotage, data exfiltration attacks, and other attack types. Furthermore, an ingestion pipeline, service interface, or other computing resource responsible for directing traffic within the computing resource service provider environment may direct the simulated attack payload to a cloned environment based at least in part on the signature included in the attack payload. In some examples, the cloned environment includes similar computing resources to those included in a customer computing resource environment or other environments mentioned in the present disclosure. In another example, the cloned environment includes metadata associated with the customer computing resource environment. As described in greater detail below, the computing resource service provider may select various customer computing resource environments to clone to execute simulated attacks on the cloned environment. The threat analysis service or other intrusion detection system may then be used to attempt to detect and/or mitigate the simulated attack. In various examples, results are obtained from the threat analysis service or other intrusion detection system and compared to the simulated attack to determine the effectiveness of the threat analysis service or other intrusion detection system.

In the preceding and following descriptions, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well known features may be omitted or simplified to avoid obscuring the techniques being described.

As noted above, a computing resource service provider can execute a variety of simulated attacks on cloned computing resources to determine the effectiveness of various security mechanisms (e.g., intrusion detection systems, threat analysis services, firewalls, etc.) without affecting computing resources executing within customer computing resource environments. Accordingly, FIG. 1 shows an illustrative example of an environment 100 in which an interface of a computing resource service provider 106 directs simulated attack payloads 124 to cloned computing resources 114 for processing. In addition, as illustrated in FIG. 1, a user 122 communicates with the computing resource service provider 106 over a network 102. Communications between the computing resource service provider 106 and the user 122 may, for instance, be for the purpose of accessing a service operated by the computing resource service provider 106, which may be one of many services operated by the computing resource service provider 106. As another example, the user 122 communicates with the computing resource service provider 106 to interact with or otherwise operate customer-operated computing resources 104.

The interface 108 may include a service frontend or other computer system responsible for directing network traffic 132, application programming interface (API), service calls, or other information directed to the computing resource service provider 106 to the appropriate entity within the computing resource service provider environment. For example, when the user 122 directs API calls to customer-operated computing resources 104 for fulfilment, the interface 108 receives the API calls and routes the API calls to the customer-operated computing resources 104 responsible for fulfilling the API call. The network traffic 132, as illustrated in FIG. 1, includes any network traffic not associated with the simulated attacker 110.

As described in greater detail below, the customer-operated computing resources 104, in various embodiments, include computing resources provided by the computing resources service provider 106 to the user 122 through various services. The services may implement an interface 108 and/or the computing resource service provider 106 may implement the interface 108. The user 122 may issue a request for access to a particular service (and/or a request for access to resources associated with the service) provided by the computing resource service provider 106. The request may be, for instance, a web service call, API request, or other request.

The user may be an individual, or a group of individuals, or a role associated with a group of individuals, or a process representing one or more of these entities that may be running on one or more remote (relative to the computing resource service provider 106) computer systems, or may be some other such computer system entity, individual, or process. Each individual, group, role, or other such collection of users may have a corresponding user definition, group definition, role definition, identity, or other definition that defines the attributes and/or membership of that collection. For example, a group may be a group of users that have the same geographical location. In another example, a role may include a set of permissions or a policy associated with a particular user and/or identity.

The definition of that group of users may include the membership of the group, the location, and other data and/or metadata associated with that group. As described in the present disclosure, a user is an entity corresponding to an identity managed by the computing resource service provider 106, where the computing resource service provider manages permissions for the identity and where the entity may include one or more sub-entities, which themselves may have identities. For example, as described in greater detail below, a particular identify and/or role is assigned to a simulated attacker 110 such that when simulated attack payloads 124 associated with the simulated attacker 110 are received at the interface 108 the simulated attack payloads 124 directs the simulated attack payloads 124 to the cloned computing resources 114 as opposed to the customer-operated computing resources 104.

The user 122 may communicate with the computing resource service provider 106 via one or more connections (e.g., transmission control protocol (TCP) connections). The user 122 may use a computer system client device to connect to the computing resource service provider 106. The client device may include any device that is capable of connecting with a computer system via a network, such as example devices discussed below. The network 102 may include, for example, the Internet or another network or combination of networks discussed below.

The computing resource service provider 106, through various services, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to, user resources, policy resources, network resources, and/or storage resources. In some examples, the resources associated with the computer services may be physical devices, virtual devices, combinations of physical and/or virtual devices, or other such device embodiments.

In various embodiments, the request for access to the service and/or customer-operated computing resources 104 is received by a service frontend which may be a component of the interface 108, which, in some examples, comprises a web server that receives such requests and processes them according to one or more policies associated with the service. As described in greater detail below, once these requests are received, the interface 108 or other component of the computing resource service provider 106 directs the request to the appropriate destination based at least in part on information included in the request. In one example, these requests are directed to a destination based at least in part on a role or identity associated with the request.

In some embodiments, the one or more policies include a permission that specifies an identity, a resource, an action, a condition, and/or an effect. In some embodiments, a permission may also specify a plurality of one or more of these elements such as, for example, a set or class of users, a collection of resources, several different actions, and/or multiple conditions. For example, a particular permission, when enforced by the interface 108, causes all requests (e.g., network traffic) associated with the identity of the simulated attacker 110 to be transmitted to the cloned computing resources 114 based at least in part on an action associated with the identity. In some embodiments, the policy may be expressed in a language independent format such as JavaScript Object Notation (JSON). Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure.

The principal may be a user, a group, an organization, a role, or a collection, and/or combination of these or other such entities. A principal may be any entity that is capable of submitting API calls that cause an action associated with a resource to be performed and/or any entity to which permissions associated with a resource may be granted. As a result, permission associated with users 122 cause network traffic 132 (e.g., API call) submitted by the users 122 to be directed to the customer-operated computing resources 104 while permissions associated with simulated attackers 110 cause simulated attack payloads 124 (which in various embodiments include network traffic 132 generated to simulate a particular attack pattern) to be directed to the cloned computing resources 114.

This allows the computing resources service provider 106 to generate analytic information associated with the performance of various threat analyses services and/or intrusion detection systems without consuming customer-operated computing resources 104. As described in greater detail below, other mechanisms for distributing and differentiating simulated attack payloads 124 and other network traffic are within the scope of the present disclosure. Other examples and/or mechanisms for including distributing and differentiating simulated attack payloads 124 include user agent information, session information, signatures, shared secrets, and any other information that can be obtained from the simulated attack payloads 124.

In some embodiments, the addition of new features to the threat analysis service and/or modification of features of the threat analysis service cause a simulated attack service, as described in greater detail below in connection with FIG. 3, to instantiate the simulated attacker 110 and execute one or more simulated attacks. In yet other embodiments, the simulated attacks are executed based at least in part on a schedule. As described above, the simulated attacks include one or more simulated attack payloads 124 that include information that causes the simulated attack payload 124 to be directed to cloned computing resources 114. In various embodiments, the definition of cloned computing resources 114 includes a copy or "clone" of a particular user's computing resource environment including the customer-operated computing resources executed within the particular user's computing resource environment. The particular user may be selected at random or pseudo randomly. In addition, the particular user may be selected based at least in part on one or more attributes of the particular user. In one example, a set of users is selected based at least in part on a number of computing resources consumed by the users such that includes a number of users selected from various ranges based at least in part on the number of computing resources consumed (e.g., large customers, medium customers, and small customers). In another example, the selection of users is distributed among users based at least in part on a distribution algorithm (e.g., even distribution algorithm).

The cloned computing resources 114, in some embodiments, include computing resources that mimic customer-operated computing resources 104. In one example, the cloned computing resources 114 include a database that operates as a particular customer-operated computing resource but does not include customer data or other customer information. In addition, the cloned computing resources 114 may behave as the customer computing resources 104 used to generate the cloned computing resources 114. The simulated attacks may be directed to a particular set of cloned computing resources 114. For example, the simulated attacker 110 may implement a particular attack pattern directed to a particular type of computing resource environment and/or computing resource. As described in greater detail below, the simulated attack payload 124 may include a tag or other additional metadata to allow the computing resource service provider 106 or other component of the computing resource service provider 106 such as the threat analysis service to determine the simulated attacker 110 and/or simulated attack pattern associated with a particular simulated attack payload 124 or set of simulated attack payloads 124. In this manner the tag may provide a mechanism to enable the computing resource service provider 106 to bind particular simulated attack payloads to particular simulated attacks.

Figure 2:
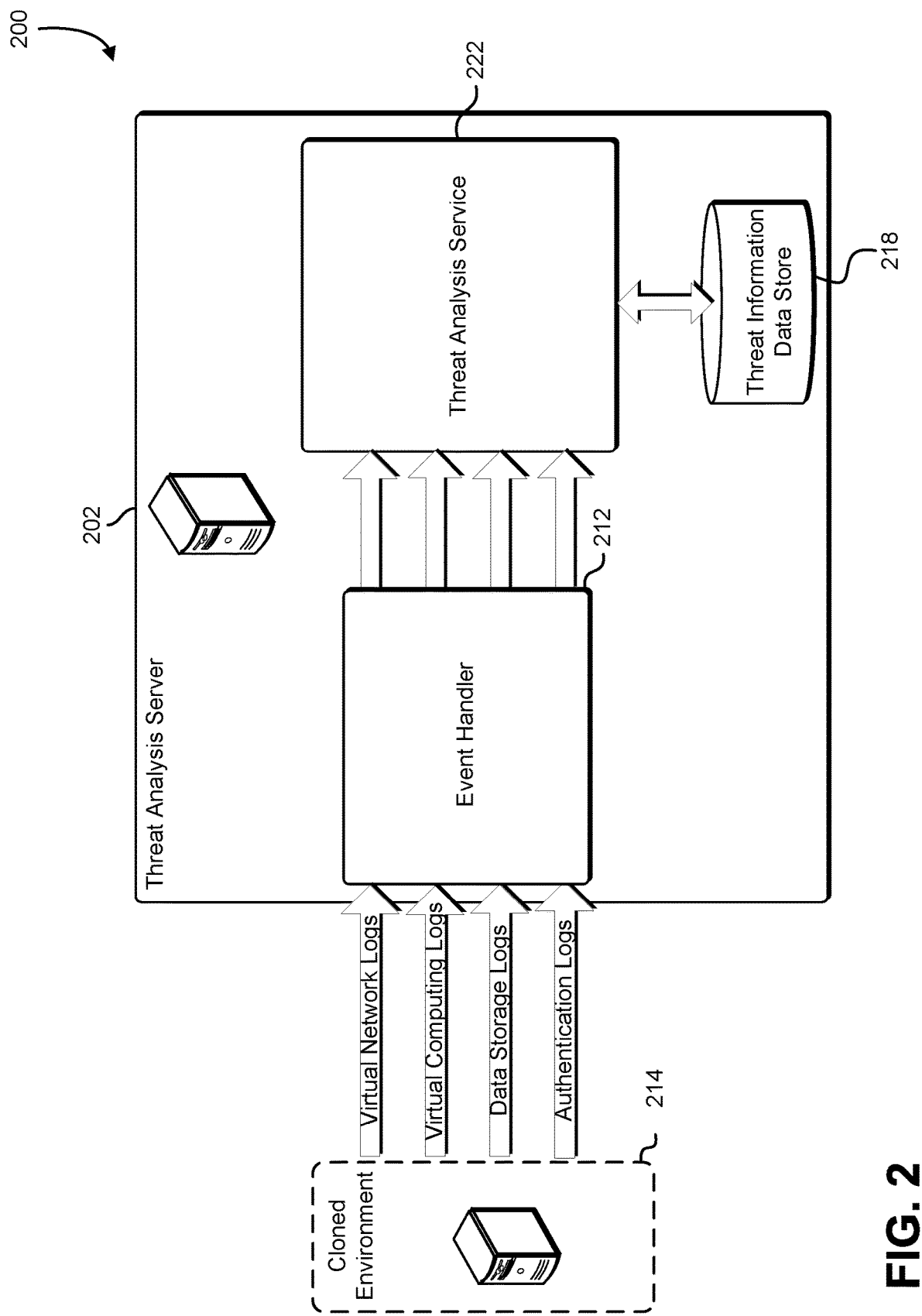
FIG. 2 illustrates an environment in which a threat analysis service detects potential simulated attacks performed on a cloned computing resource environment in accordance with an embodiment.

FIG. 2 shows an illustrative example of a threat analysis service, in accordance with an embodiment. A block diagram 200 illustrates a structure of a threat analysis server 202. The threat analysis server 202 is a computer system that includes a processor and memory. The memory store executable instructions that, if executed, implement a threat analysis service 222, an event handler 212, and a threat information data store 218. The event handler may include a plurality of event handlers each configured to detect and/or parse information obtained by the threat analysis service 222. The threat analysis server 202, in various embodiments, maintains the threat information data store 218 in a storage device accessible to the threat analysis server 202. In some examples, the storage device is nonvolatile memory, disk media, or optical media. In another example, the storage device is a storage service accessible to the threat analysis server 202, such as a network attached storage device or online data storage service.

The threat analysis server 202 may be deployed into a customer environment and/or cloned environment 214 by an administrator or by a management service operated by a computing resource service provider. In some implementations, the threat analysis server 202 is implemented as a virtual machine that is created by the computing resource service provider and connected to a virtual network allocated to the customer. In another implementation, the threat analysis server 202 is a network appliance, and the computing resource service provider configures a logical connection between the network appliance and a customer network. In various embodiments, the threat analysis server 202 is copied from the customer computing resource environment from which the cloned environment 214 is generated. The cloned environment may include various computing resources that are copied or mirrored from a particular customer computing resource environment as described above in connection with FIG. 1.

In yet other embodiments, the cloned environment 214 includes metadata associated with the customer computing resource environment described above in connection with FIG. 1. In one example, the cloned environment 214 includes copies of the logs (e.g., the virtual network logs, virtual computing logs, data storage logs, and authentication logs as illustrated in FIG. 2) obtained from the customer computing environment. In such examples, the logs may be modified or otherwise edited to include simulated attacks. Furthermore, in various embodiments, the cloned environment 214 includes a copy of the behavioral model used by a particular threat analysis service 222 instantiated within a particular customer computing resource environment.

In some embodiments, the threat analysis service 222 obtains diagnostic information and/or logs from a plurality of event handlers 212 such as a virtual networking service event handler, a virtual computing service event handler, a data storage service event handler, an authentication service event handler, or a simulated attack event handler. In such embodiments, the event handler 212 may be divided into a plurality of components. The threat analysis service 222 parses the diagnostic information and produces a collection of events. Based at least in part on information provided by the event handler 212, the threat analysis service 222 determines a type for each event record.

In one embodiment, the threat analysis service 222 categorizes the event records as trigger events, alert events, and normal events. Trigger events are events that indicate a potential system compromise, expansion of rights to a particular user, or modification or expansion of security policies. Alert events describe events that have the potential to jeopardize, corrupt, or compromise sensitive data (e.g., storage location that are indicated as sensitive within a customer environment but that do not contain customer data in the cloned environment 214) or the cloned environment 214. Normal events are operational events that do not indicate a potential compromise or represent a significant operational risk, but may indicate a connection between trigger events and alert events. For example, a particular trigger event may indicate that a password associated with a privileged user account has been reset. A normal record may indicate that the privileged user account was used to generate a new set of user credentials. An alert event may indicate that sensitive data has been exported from the cloned environment 214 using the new set of user credentials. In this particular example, the threat analysis service 222 determines the connection between the trigger event and the alert event using the normal event by noting that the compromised privileged user account was used to generate the new set of credentials, and the new set of credentials was used to access the sensitive data.

The event handler 212 acquires diagnostic information relating to the operation of services and computer systems in the cloned environment 214, and provides information to the threat analysis service 222 that allows the threat analysis service 222 to detect simulated attacks and determine an effectiveness measure of the threat analysis service 222 such as a false negative rate and/or a latency or interval of time between the launch of the simulated attack and detection by the threat analysis service 222 as described in greater detail below. In one example, a virtual networking service event handler obtains diagnostic information associated with one or more virtual networks associated with the cloned environment. The diagnostic information, in various embodiments, includes event logs, trace logs, diagnostic logs, and other diagnostic information related to the operation of the cloned environment 214 obtained from virtual networking appliances, and virtual networking services that implement at least a portion of the cloned environment.

In another example, a virtual computing service event handler obtains diagnostic information associated with virtual machines, container runtimes, and other virtual computing resources executed within the cloned environment 214. In example, a streaming service obtains the diagnostic information from the computing resources and transmits it to the event handler. In another example, the event handler subscribes to a category or topic and the streaming service provides diagnostic information associated with the category or topic. In yet another example, the event handler obtains the diagnostic information from a storage location where the computing resources maintain or store diagnostic information.

Other computing resources or types of computing resources may have a corresponding component of the event handler 212. The threat analysis service 222, in various embodiments, uses one or more statistical and/or behavioral models to detect attacks (including simulated attacks) based at least in part on the information obtained by the event handler 212. The threat analysis service 222, in various embodiments, detects attacks by at least detecting one or more events associated with a particular attack. An event matching particular characteristic such as a time at which the event occurred, a credential used to authorize the event, a system on which the event occurred, or other parameters associated with the event, as described above, may be categorized and an action may be taken.

In one example, an alarm event detected by the threat analysis service 222 causes the threat analysis service 222 to trigger an alarm. The alarm may be received at an administrative account or role associated with the cloned environment 214. In various embodiments, the events detected and/or event record generated by the threat analysis service 222 is compared to a simulated attack executed by a simulated attack as described above in connection with FIG. 1. The comparison may be used to determine an effectiveness of the threat analysis service 222 to detect and/or mitigate the particular simulated attack. In some embodiments, individual event records in a set of event records are linked to one another representing a single simulated attack.

The threat analysis service 222 or other component of the computing resource service provider may generate a measure of the effectiveness of the threat analysis service 222 to detect simulated attacks and store the measure in the threat information data store 218. In yet other embodiments, the event records generated by the threat analysis service 222 are stored in the threat information data store 218 and made available to other services of the computing resource service provider, such as a simulated attack service, such that the other services can determine the measure of the effectiveness of the threat analysis service 222. In one example, the simulated attack service executes 10 distinct exfiltration attacks (e.g., attempts to extract data from the cloned environment 214) on the cloned environment 214, and the threat analysis service 222 records five exfiltration attacks in an event record and stores the event record in the threat information data stored 218. The simulated attack service obtains the event record and determines a 50% false negative rate of the threat analysis service 222 to detect the exfiltration attacks.

Figure 3:
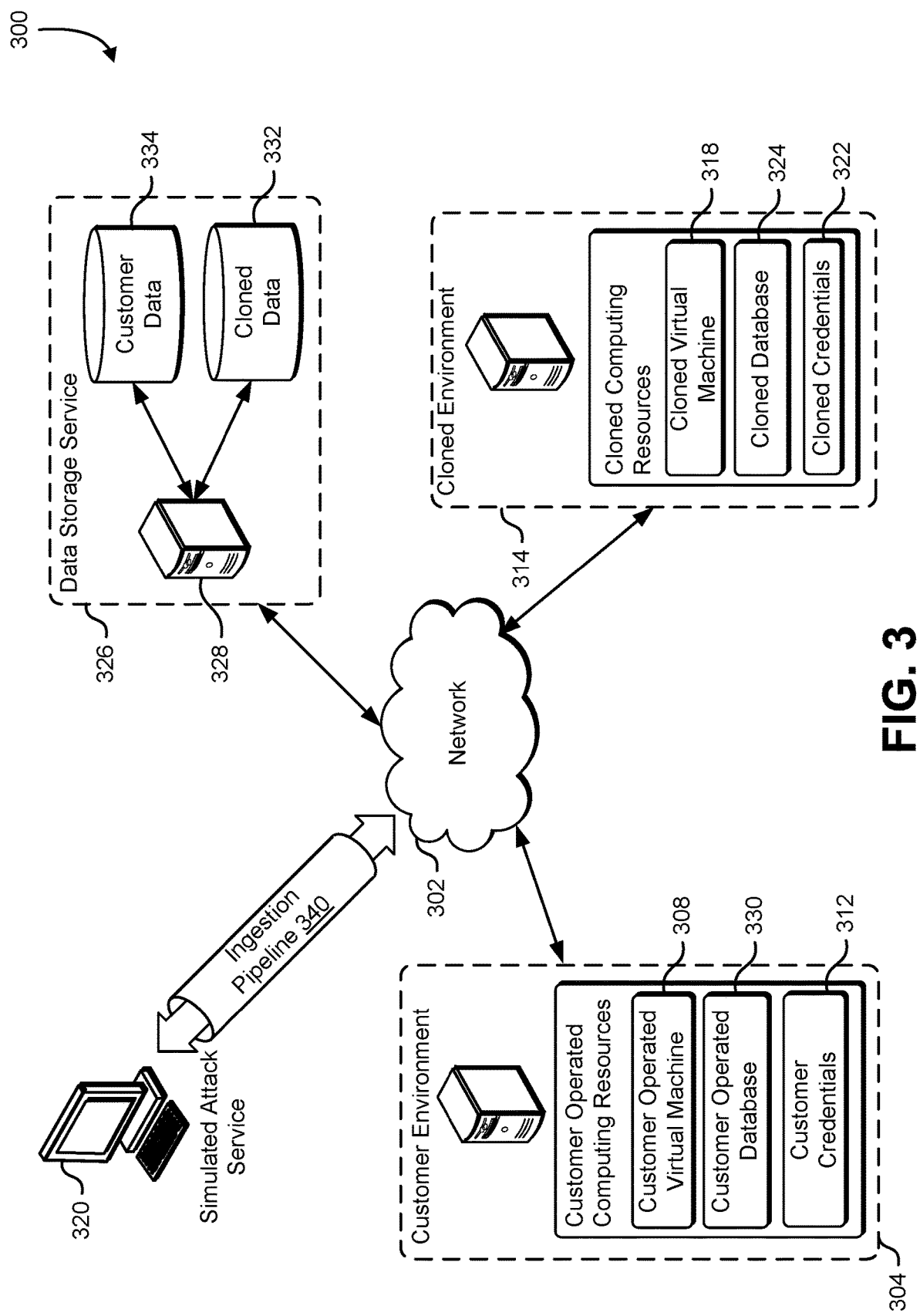
FIG. 3 illustrates an environment in which simulated attacks are performed on a cloned computing resource environment by a simulated attack service in accordance with an embodiment.

FIG. 3 shows an illustrative example of various computing resource environments, in accordance with an embodiment. The environment 300 illustrates a customer computing resource environment 304, a cloned computing resource environment, a data storage service 326, and a simulated attack service 320 that is executing one or more simulated attacks by at least transmitting simulated attack payloads through an ingestion pipeline. Furthermore, as illustrated in FIG. 3, the environment 300 includes a network 302 that connects a variety of services and computer systems provided by a computing resource service provider as described above. The network 302 may include a public network, such as the Internet, a private network, such as a virtual private network, or a combination of various networks. In various embodiments, the network 302 is implemented using a combination of virtual routers, virtual switches, virtual hubs, and other network appliances configured by a computing resource service provider for the customer.

In some embodiments, the customer computing resource environment 304 is generated and/or implemented by the computing resource service provider or one or more services thereof, connected to the network 302, and made available to the customer for use through the ingestion pipeline 340. The ingestion pipeline 340, in various embodiments, includes a set of server computer systems with executable code that, when executed by the set of server computer systems causes the ingestion pipeline 340 to proxy or otherwise distribute network traffic (e.g., API calls, Hypertext Transfer Protocol (HTTP) requests, service calls, etc.) across the network 302 to the appropriate destination.

As described above, the ingestion pipeline 340 may obtain simulated attack payloads from the simulated attack service 320 or component thereof such as a simulated attacker and proxy the simulated attack payload to the cloned computing resource environment 314 based at least in part on information included in the simulated attack payload. In addition, the ingestion pipeline 340 may determine a particular cloned computing resource environment to provide the simulated attack payload based at least in part on information included in the simulated attack payload. The information included in the simulated attack payload may include a signature, user agent information, role information, identity information, keyed-hash message authentication code (HMAC) information, shared secret, or any other information or combination of information suitable for differentiating a simulated attack payload from other network traffic. In various embodiments, the HMAC includes a shared secret between the simulated attack service 320 the ingestion pipeline 340 (e.g., a value provided to both endpoints) that is hashed in accordance with a particular hashing algorithm. The value may include a combination of attributes of the simulated attack service 320 and/or simulated attack such as user agent, credentials, roles, network address, or other identifying information.

Returning to FIG. 3, the customer computing resource environment 304 may include a variety of computing resources such as virtual computer system instances, container instances, or other processing resources. The customer computing resource environment 304, as illustrated in FIG. 3, also includes access to customer data 334 maintained by the data storage service 326. The data storage service 326, in some embodiments, includes a set of server computer systems that provide customers with access to a data storage device 328 through a service frontend or other interface. In various embodiments, the customer computing resource environment 304 includes metadata generated by computing resources within the customer computing resource environment 304 and/or metadata about computing resources with the customer computing resource environment 304. Metadata of the customer computing resource environment 304 may include logs, metrics, attributes, options, or other information about the customer computing resource environment 304. In addition, as described in the present disclosure, the metadata of the customer computing resource environment 304 may be used to generate the cloned computing resource environment 314. In an example, the metadata of the customer computing resource environment 304 is used to determine attributes of cloned computing resources within the cloned computing resource environment 314 as described in greater detail below.

Furthermore, the customer computing resource environment 304 illustrated in FIG. 3 includes customer credentials 312, a customer-operated virtual machine 308, and a customer-operated database 330. The customer credentials 312 may include a username and password, a one-time use code, cryptographic key, roles, permissions, or identities usable to access various customer-operated computing resources. The customer-operated virtual machine 308, in an embodiment, includes a virtual machine implemented by a computer server and supported by a virtualization layer. The computer server may be provided by a virtual computing service of the computing resource service provider as describe in greater detail below. Similarly, the customer-operated database 330, in an embodiment, includes an instance of a database provided by a database services or other data storage service of the computing resource service provider. In yet other embodiments, the customer-operated computing resources within the customer computing resource environment 304 include computing resources provided by a third party (e.g., a second computing resource service provider) or provided by the customer itself (e.g., computing resources in a data center operated by the customer).

In some implementations, the computing resource service provider provides a threat analysis service that obtains diagnostic information and/or logs generated by computing resources within the customer computing resource environment 304 to detect anomalous activity. In yet other implementations, the cloned computing resource environment 314 includes the diagnostic information and/or logs obtained from computing resources within the customer computing resource environment 304. Furthermore, the diagnostic information and/or logs may be modified based at least in part on one or more simulated attacks to simulate an attack of the customer computing resource environment 304 and/or cloned computing resource environment 314. In the example illustrated in FIG. 3, the threat analysis service or other service of the computing resources service provider (e.g., the simulated attack service 320) generates a cloned computing resource environment 314 to measure or otherwise determine an effectiveness of the threat analysis service to detect anomalous activity within the customer computing resource environment 314. The cloned computing resource environment 304 illustrated in FIG. 3 includes a cloned virtual machine 318, a cloned database 324, and cloned credentials 322.

In various embodiments, the cloned virtual machine 318 is instantiated based at least in part on an image of the customer-operated virtual machine 308. Furthermore, the image of the customer-operated virtual machine 308 may be modified to protect sensitive customer information. In yet other embodiments, the cloned virtual machine 318 is instantiated using the same or similar attributes as the customer-operated virtual machine 308. In an example, the cloned virtual machine 318 includes the same virtual processor type and amount of memory, and executes the same operating system as the customer-operated virtual machine 308.

Similarly, the cloned database 324, in various embodiments, is an instance of a database instantiated using an image or schema of the customer-operated database 330. The cloned credentials 322 may include a set of permissions, as described above, obtained from the customer credentials 312. In this manner, the cloned computing resource environment 314 may contain features and/or attributes obtained from the customer computing resource environment 304 such that the threat analysis service and simulated attack operate in the same manner as they would in the customer computing resource environment 304. To that end, the features and/attributes may include network appliances, network connections, policies, permissions, computing resources, and combinations thereof.

The customer computing resource environment 304 may also include access to the data storage service 326 implemented by the storage device 328. In some embodiments, the data storage service 326 is hosted by a storage device owned and operated by the customer. In another implementation, the data storage service 326 is hosted on a storage device managed by the computing resource service provider and made available to the customer as described above. In various embodiments, the data storage service 326 is used by the customer to maintain customer data 334 as described above. The customer data 334 may include a verity of information such as executable instructions, records, work product, databases, or other information used by the customer. In addition, the data storage service 326, as illustrated in FIG. 3, includes cloned data 332. The cloned data 332 may be associated with the cloned computing resource environment 314. In some examples, the cloned data 332 represents a computing resource of the cloned computing resource environment 314. In these examples, a simulated exfiltration attack may attempt to extract the cloned data 332 from the data storage service 326. If a simulated attacker accesses the cloned data 332 maintained by the data storage service 326, services and/or devices in the cloned computing resource environment 314 may generate events and/or records (e.g., diagnostic information such as logs) which are obtained and analyzed by the threat analysis service to detect anomalies within the customer computing resource environment 304.

As described above, the customer computing resource environment 304 may be selected from a set of customer computing resource environments to be used to generate the cloned computing resource environment 314. Furthermore, the customer computing resource environment 304 may be selected based at least in part on a simulated attack to be executed, an attribute and/or feature of the customer computing resource environment 304, a feature and/or operation of the threat analysis service, or other mechanism suitable for targeting customer computing resource environment 304. In one example, a new feature of the threat analysis service provides additional protection for customers with a large number of database instances. As a result, the customer computing resource environment 304 may be selected based at least in part on a number of database instances within the customer computing resource environment 304.

As described in greater detail below in connection with FIG. 4, the simulated attack service 320 may execute a plurality of simulated attacks which are directed by the ingestion pipeline 340 to the cloned computing resource environment 314. The simulated attacks include various attack types as well as attack patterns. For example, simulated attack types may include exfiltration attacks, sabotage, discovery attacks, network attack, or other attack types. In addition, each simulated attack type may have various attack patterns associated with the simulated attacks. An attack pattern, in various embodiments, includes a set of operations performed by a simulated attack to carry out the particular simulated attack type. Furthermore, the set of operations, when executed by a simulated attacker, cause the simulated attacker to generate a set of simulated attack payloads as described above.

In one example, a simulated attack executes a simulated attack that includes a hopping mechanism that causes simulated attack payloads to appear to various computing resources of the cloned computing resource environment 314 to originate from different computer systems (e.g., every 10 simulated attack payloads, the simulated attacker causes a network address associated with the simulated attack payload to be modified). The simulated attack service 320 may use a plurality of different evasion techniques or other techniques to simulate a variety of different attacks. In addition, the simulated attack service 320, in various embodiments, generates a simulated attack that attempts to disable security features and/or security application of the cloned computing resource environment 314. As described above, the simulated attack service 320 may continuously execute simulated attacks based at least in part on a schedule and/or other triggering events.

Figure 4:
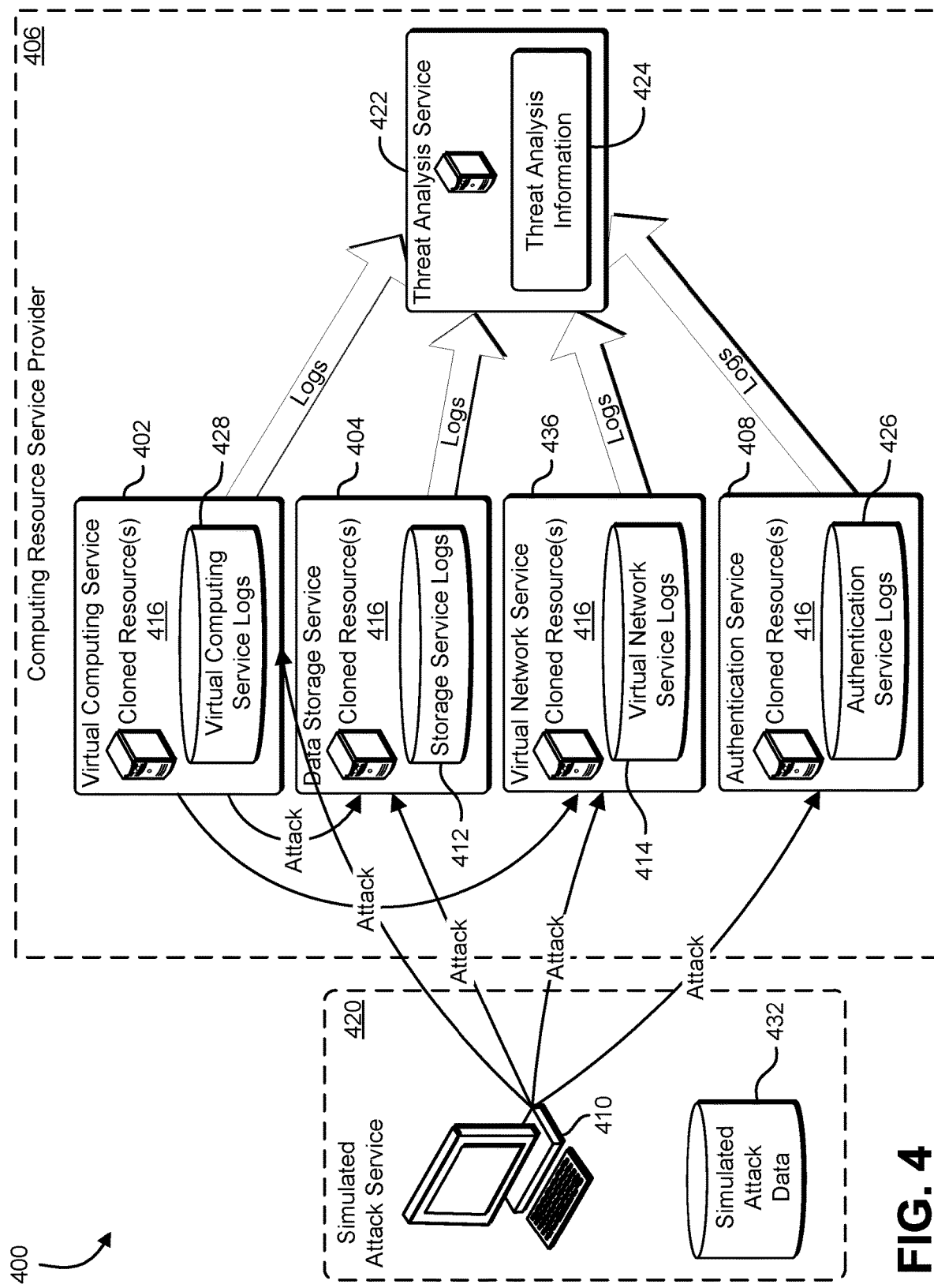
FIG. 4 illustrates an environment in which simulated attacks are performed on a cloned computing resource environment by a simulated attack service in accordance with an embodiment.

FIG. 4 shows an illustrative example of an environment 400 in which various embodiments may be practiced. The environment 400 illustrates an example of a computing resource environment provided to a customer by a computing resource service provider 406. The computing resource environment includes a number of computing devices and services including a virtual computing service 402, a data storage service 404, a virtual network service 436, and an authentication service 408. Furthermore, the computing resource environment, as illustrated in FIG. 4, includes cloned computing resources 416 as described above. In numerous embodiments, computing resource environments may be modeled from a copy of a customer computing resource environment. In this manner, the cloned computing resources 416, in an embodiment, are generated and included in the computing resource environment as representative of computing resources in the customer computing resource environment such that a threat analysis service 422, when a simulated attack service 420 executes a simulated attack, may detect the simulated attack as if the simulated attack was directed at the computing resources in the customer computing resource environment.

The virtual computing service 402 provides processing resources for use by a customer. In various examples, the virtual computing service 402 may be a computer system, virtual computer system, computer server, or server cluster allocated by the computing resource service provider 406 to the customer. In some embodiments, the computing resource service provider 406 generates a virtual machine, container runtime, or other virtual computing resource environment which is then deployed and makes available to the customer for use. In addition, to use by customers of the computing resource service provider 406, virtual computing service 402 provides cloned computing resources 416 for user by the simulated attack service 420 or other service of the computing resource service provider 406.

The simulated attack service 420, in various embodiments as described above, executes simulated attacks on the cloned computing resources 416. In yet other embodiments, the simulated attack service 420 modifies metadata obtained from the customer computing resource environment to simulate an attack. The virtual computing service 402 generates a set of virtual computing service logs 428. The virtual computing service logs 428 may include log files, trace files, diagnostic information, crash dumps, operational message databases, or other diagnostic information generated by the virtual computing service 402. As described above, this log information may be used by the threat analysis service 422 to generate threat analysis information 424. The threat analysis information 424, in an embodiment, provides an indication of the threat analysis service's 422 ability and/or success at detecting simulated attacks executed by the simulated attack service 420.

The data storage service 404 provides a service that allows a customer to store data on a storage device managed by the computing resource service provider 406. In addition, the data storage service 404, in various embodiments, includes cloned computing resources 416. In an example, the simulated attack service 420 causes the data storage service to store data mimicking data stored by the customer. The data storage service 404 may, in various examples, be a network accessible storage device, an online storage service, network attached storage device, or remotely accessible volume allocated to the customer by the computing resource service provider 406. In some implementations, the computing resource service provider 406 provides a web interface to a storage service implemented on a set of storage servers maintained by the computing resource service provider 406. The data storage service 404 allocates storage space on the set of storage servers to the customer and/or other services of the computing resource service provider 406 (e.g., the simulated attack service 420), and manages access to the storage service using account information and/or identity information. The data storage service 404 generates a set of storage service logs 412. The storage service logs may include trace files, error logs, log files, activity logs, audit files, or other diagnostic information generated by the data storage service 404. As described above, this log information may be used by the threat analysis service 422 to generate threat analysis information 424.

The virtual network service 436 provides a computer network that enables computing resources within the environment to communicate. The virtual network service 436 may, in various examples, be implemented by the computing resource service provider 406 using a set of virtual network routers, switches, and firewalls maintained by the computing resource service provider 406 and allocated to the customer and/or other services of the computing resource service provider 406 (e.g., the simulated attack service 420). In some embodiments, the virtual networking service deploys one or more virtual networking devices to create a network environment. The virtual networking devices may include virtual switches, virtual routers, and virtual firewalls. In some implementations, one or more network appliances may be included in the network environment. The virtual network service 436 generates a set of virtual network service logs 414. In various examples, the virtual network service logs 414 may be assembled from a set of logs, event records, and trace files generated by one or more of the networking devices comprising the network environment. As described above, this log information may be used by the threat analysis service 422 to generate threat analysis information 424.

The authentication service 408 is a service provided by the computing resource service provider 406 that authenticates users and/or user requests for resources within the computing resource environment. In some examples, the authentication service 408 is implemented by the computing resource service provider 406 using software running on a computer system managed by the computing resource service provider 406. Access to the authentication service 408 is provided via a computer network using credentials provided to various endpoints such as the customer or simulated attack service 420. The authentication service 408 generates a set of authentication service logs 426. The authentication service logs 426 may include log files, event records, trace files, and other diagnostic information describing the operation of the authentication service 408. For example, the authentication service logs 426 may include events describing successful and unsuccessful attempts to acquire an authentication token. As described above, this log information may be used by the threat analysis service 422 to generate threat analysis information 424. Furthermore, the virtual computing service 402, the data storage service 404, the virtual network service 436, and the authentication service 408 may provide computing resources to a plurality of customers and service simultaneously. In addition, these services, in various embodiments, are a portion of the plurality of services provided by the computing resource service provider 406.

The simulated attack service 420 in various embodiments, executes one or more simulated attacks in an attempt to compromise the cloned computing resources 416 within the customer computing resource environment, thereby gaining access to one or more of the services, computing resources, and/or data in the computing environment. In one example, a simulated attack can be initiated by a simulated attacker 410, as described above, and directed against computing resources within the customer environment such as the virtual computing service 402, the data storage service 404, the virtual network service 436, or the authentication service 408 and/or computing resources provided by these services. In this example, if the simulated attacker 410 is successful in compromising one of the services, the simulated attacker 410 may attempt to compromise another service using the already compromised service. In this manner, the simulated attack service 420 may simulate conditional attack patterns. For example, simulated attacker 410 that compromises the data storage service 404 may attempt to modify an executable image stored on the data storage service 404 so that it executes on the virtual computing service 402 and causes the virtual computing service 402 to become compromised.

In addition, as illustrated in FIG. 4, the simulated attack service 420 includes simulated attack data 432. The simulated attack data 432 may include information that can be used to identify simulated attacks. For example, the simulated attack data may include the signature of one or more simulated attack payloads transmitted by the simulated attacker 410. In yet other embodiments, the simulated attack data 432 includes a database indicating the time of one or more simulated attacks, a signature of the one or more simulated attacks, an endpoint and/or target of one or more simulated attacks, a type of one or more simulated attacks, or any other information suitable for determining the effectiveness and/or success of the threat analysis service 422 in detecting the one or more simulated attacks.

In one embodiment, the threat analysis information 424 is compared with the simulated attack data 432 to determine a number of simulated attacks detected by the threat analysis service 422. In one example, the comparison is used to determine the false negative rate of the threat analysis service 422 to detect the one or more simulated attacks. In addition, the comparison of the threat analysis information 424 to the simulated attack data 432, in some embodiments, indicates whether the threat analysis service 422 appropriately categorized the one or more simulated attacks and/or associated with the one or more simulated attacks with the appropriate severity level. In one example, the simulated attack data 432 indicates an interval of time during which a simulated attack, including a plurality of attack payloads, was launched. This information can then be compared to threat analysis information 424 (e.g., to determine if the threat analysis service 422 correctly detected an attack based at least in part on the frequency and/or volume of simulated attack payloads associated with a particular simulated attack).

Furthermore, the simulated attack data 432 and the threat analysis information 424 may be used to determine a latency in detecting a particular attack (e.g., an amount of time taken by the threat analysis service 422 to detect the particular attack). In addition, the simulated attack data 432, in various embodiments, includes historical data such as simulated attacks executed, versions of behavioral/statistical models utilized by the threat analysis service 422, measures of effectiveness of the threat analysis service 422 (e.g., false negative rate, latency, appropriate severity level determined, etc.), signatures used in simulated attack payloads, types of cloned computing resource environments tested, or other information associated with one or more previously executed simulated attacks. This information may be used in a variety of ways to measure the effectiveness of the threat analysis service 422 across a plurality of simulated attacks. In one example, the same simulated attack is executed on the cloned environment over two or more different behavioral models and/or versions of a behavioral model used by the threat analysis service 422 to detect attacks. The simulated attack service 420 then determines the difference in an amount of time taken to detect the simulated attack between the different behavioral models. In another example, the same attack is executed on the cloned environment at two different points in time and the simulated attack service determines an amount of time the threat analysis service 422 takes to detect each attack. In this manner the simulated attack service 420 can generated a measure of effectiveness between two or more threat analysis services 422 or aspects of the cloned computing resource environment that may affect the threat analysis service (e.g., structural or operational attributes of the cloned computing resource environment).

In various embodiments, the threat analysis service 422 includes computing resources such as server computer systems that implement various intrusion detection systems, statistical model, behavioral models, anomaly detection systems, or other system to detect attacks including simulated attacks. The threat analysis service 422 is able to access the diagnostic information produced by the computer systems in the computing resource environment illustrated in FIG. 4. In one example, a stream service and/or ingestion pipeline obtains the logs from the services and makes the logs accessible to the threat analysis service 422. In an embodiment, making the logs accessible includes causing the logs to be stored by the data storage service such that logs are accessible to the threat analysis service 422 (e.g., credentials associated with the threat analysis service 422 allow access to a storage location containing the logs).

In some examples, the threat analysis service 422 is deployed with computing resource environment. The threat analysis service 422 is implemented as instructions that execute on a threat analysis service. In some examples, the threat analysis server may be a computer system, computing appliance, virtual machine, server cluster, container runtime, or network-based computing service. When executed, the instructions retrieve diagnostic information from the customer environment, analyze diagnostic information, and identify anomalies based at least in part on connections between events that occur in a plurality of customer computing resources. For example, the threat analysis service 422 is able to retrieve the virtual computing service logs 428 and the storage service logs 412, and determine that a compromise of the data storage service 404 has been used to compromise the virtual computing service 402.

As described above, the threat analysis service 422 may process the logs using various intrusion detection mechanisms including statistical and/or behavioral models. These statistical and/or behavioral models, in various embodiments, are generated at least in part by security engineers. In addition, these models may utilize machine learning techniques to improve anomaly detection using information obtained from a plurality of customer computing resource environments. As illustrated in FIG. 4, the threat analysis service 422 processes the logs to generate threat analysis information 424. In an embodiments, the threat analysis information 424 indicates anomalous activity detected by the threat analysis service 422, alarms triggered, notifications transmitted, security events, or any other information generated by intrusion detection systems.

In various embodiments, the threat analysis information 424 is used by the simulated attack service 420 to determine the number of simulated attacks detected by the threat analysis service 422. In one example, a false negative rate for a set of simulated attacks executed by the simulated attack service 420 is determined based at least in part on the detected attacks indicated in the threat analysis information 424. As described above, the set of simulated attacks may be executed to test a new intrusion detection system and/or model or a modification to an existing intrusion detection system and/or model. In addition, the computing resource environment may include particular cloned computing resources to test various aspects and/or performance of the intrusion detection systems and/or models utilized by the threat analysis service 422. In this manner, the computing resources service provider 406 may measure the effectiveness and potential impact on customers of modification to and/or the introduction of new intrusion detection systems and/or models. In various embodiments, the execution of a plurality of simulated attacks modifies the operation of the threat analysis service 422. For example, a machine learning algorithm used by the threat analysis service 422 may modify a rule or behavior to indicate that a particular attack is a normal operation of the system due to the plurality of executions of the particular attack. As a result the environment illustrated in FIG. 4, may be periodically or aperiodically reset, deleted, and/or replaced.

Figure 5:
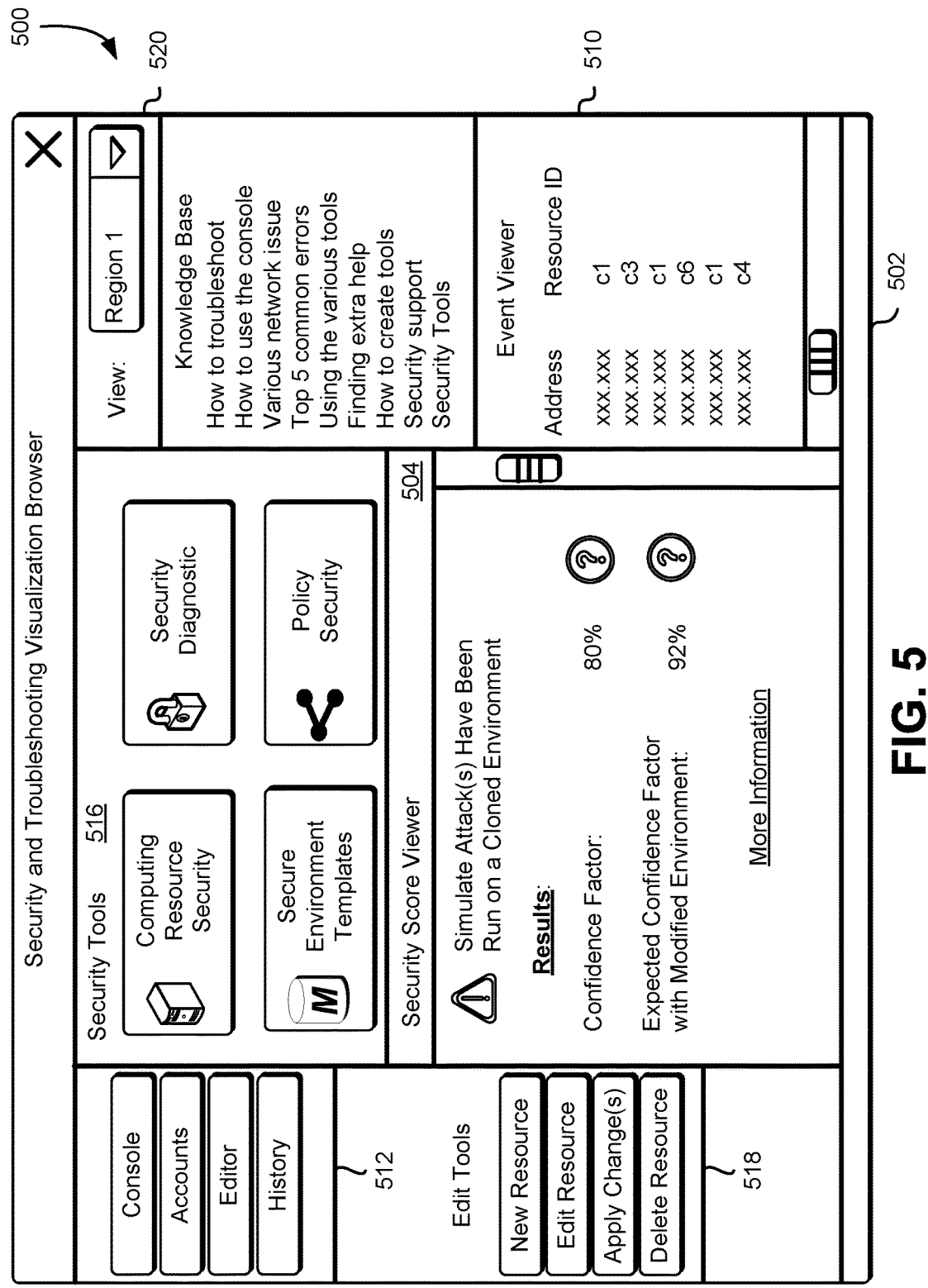
FIG. 5 illustrates an environment 500 in which a management console is presented to a user as a graphical user interface displayed by a computing device in accordance with an embodiment.

FIG. 5 illustrates an example environment 500 where a security and troubleshooting visualization browser 502 may be used to provide threat analysis information generated by a threat analysis service based at least in part on diagnostic information obtained from a cloned environment as described in the present disclosure at least as described above in connection with FIGS. 1-4 and in accordance with at least one embodiment. As described above, in various embodiments, the security and troubleshooting visualization browser 502 is executed by a computer system and is provided as a user interface to a set of services such as a web service, threat analysis service, or other services as described in the present disclosure.

As illustrated in FIG. 5, the security and troubleshooting visualization browser 502 is provided as a user interface executed by an application, such as a web browser executing on a computer system operated by the customer, as well as other user interfaces that may be used to present threat analysis information as described above. Furthermore, as illustrated in FIG. 5, the customer is presented with threat analysis information generated by a threat analysis service in a display pane 504 labeled as the "Security Score Viewer." The display pane 504 may include any of the threat analysis information as described above. In the specific example illustrated in FIG. 5, the display pane 504 includes results of the threat analysis service detecting one or more simulated attacks by a simulated attack service as described above.

In an example, the display pane 504 includes a percentage of the simulated attacks detected by the threat analysis services during an interval of time during which a set of simulated attacks were executed by the simulated attack service. Furthermore, the display pane 504 may include a set of suggested modification to the customers computing environment to improve the effectiveness of the threat analysis service and a corresponding expected increase of a confidence factor. The confidence factor indicates a likelihood that the threat analysis service will detect an attacker. The set of suggested modification, in various embodiments, is determined by the threat analysis service based at least in part on the customer computing resource environments operated by other customers.

The security and troubleshooting visualization browser 502 includes security tools 516 that aid the customer in performing various operations as described in greater detail above. In an example, the security tools aid the customer to make the suggested modifications to the customer's computing resource environment to improve the performance of the threat analysis service. As illustrated in FIG. 5, the security and troubleshooting visualization browser 502 further includes a set of options 512 used to perform various functions in connection with the security and troubleshooting visualization browser 502. The set of options 512 may be a set of functions included in the security and troubleshooting visualization browser 502 that enables a customer to perform a variety of operations as described in greater detail above in connection with FIG. 5. The options 512 may be configured as graphical user interface elements of the security and troubleshooting visualization browser 502.

The customer may use editing tools 518 to edit, create, or modify existing computing resource environments as described above. An operation enabled by the security and troubleshooting visualization browser 502 includes a view of different regions from a drop-down menu 520. The different regions may include different geographical regions or different logical regions within the same or different geographical regions. For example, different regions may include two or more separate virtual networks. Customers may navigate to a particular group using a graphical user interface element as illustrated in FIG. 5. Selection of a particular region may limit the information and generate views of information specific to the region.

In various embodiments, the software development tools provide, through the security and troubleshooting visualization browser 502, the customers with resources to aid in detection and mitigation of security threats. The security and troubleshooting visualization browser 502 may further include an event viewer 510. The event viewer 510, in various embodiments, provides threat analysis information related to the customer's computing resource environment. In one example, the event viewer 510 includes a set of anomalous activity detected by the threat analysis service. The event viewer 510 may enable the customer to categorize events as threats or non-anomalous behavior.

Figure 6:
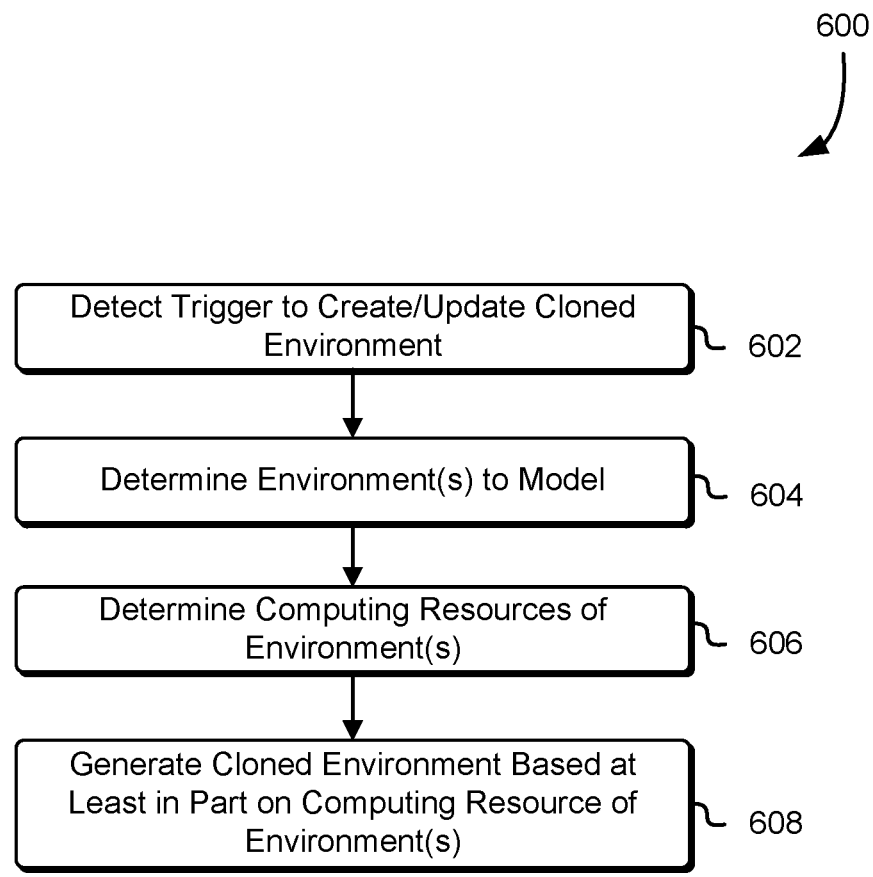
FIG. 6 is a block diagram illustrating a process for generating cloned computing resource environments in accordance with an embodiment.

FIG. 6 is a block diagram illustrating an example of a process 600 for generating a cloned computing resource environment in accordance with at least one embodiment. Some or all of the process 600 (or any other processes described, or variations and/or combinations of those processes) may be performed under the control of one or more computer systems including executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 600 may be performed by any suitable system, such as a server in a data center, by various components of the environment 300 and 400 described in conjunction with FIGS. 3 and 4, such as a simulated attack service, by multiple computing devices in a distributed system of a computing resource service provider or by a service provided by a computing resource service provider. The process 600 includes a series of operations which result in the generation of a cloned computing resource environment for the purpose of executing a set of simulated attacks to determine an effectiveness of a threat analysis service. For example, the process 600 includes detecting a trigger to create and/or update a cloned computing resource environment 602. As described above, various triggers may be used for example modification to existing intrusion detection systems, the addition of new intrusion detection systems, a schedule, a request by an administrator or other entity, or some combination thereof.

In step 604, the system executing the process 600 determines a set of computing resource environments to model. The set of computing resource environments, as described above, may be selected based at least in part on attributes of the computing resource environments. In one example, a particular computing resource environment is selected based at least in part on a size of the computing resources environment. In another example, a particular computing resource environment is selected based at least in part on a geographic location of computing resources within the particular computing resource environment. In various embodiments, a set of possible computing resource environments that may be modeled is selected, and the set of computing resource environments is a subset selected from the set of possible computing resource environments. Selection of the members of the set of computing resource environments may be made randomly, pseudo randomly, or based at least in part on the attributes of the computing resource environments.

In step 606, the system executing the process 600 determines the set of computing resources in the customer computing resource environments to be cloned. In one example, the system executing the process 600 obtains account information associated with the customer indicating the computing resources and configuration of the computing resources with the customer's computing resource environment. In another example, the system executing the process 600 obtains metadata associated with the customer computing resource environment. As described above, a particular customer computing resource environment may include a number of computing resources such as computer systems, virtual computer systems, network appliances, security groups, firewalls, switches, storage devices, credential, policies, or other computing resources. In addition, any number of these computing resources may be provided by one or more services of the computing resource service provider.

These services may maintain metadata associated with the computing resources provided to the customers. In addition, the computing resources themselves may maintain and/or generate metadata which may be used to generate the cloned computing resource environment as described in the present disclosure.

In step 608, the system executing the process 600 generates cloned computing resource environments based at least in part on the computing resources included in the customer computing resource environments. As described above, the cloned computing resource environments may include computing resources that are instantiate to mimic computing resources in a particular customer computing resource environment such that one or more simulated attacks may be executed on the cloned computing resource environment as if they had been executed on the customer computing resource environment. In one example, the system executing the process 600 instantiates a set of virtual machines using the same machine image as used to instantiate virtual machines in the customer computing resource environment. In another example, the system executing the process 600 causes a virtual private network to be instantiated between two or more cloned computing resources based at least in part on network settings utilized within the customer computing resource environment.

In various other embodiments, the cloned computing resource environment includes a copy of the metadata associated with the customer computing resource environment. In one example as described above, the cloned computing resources include a copy of a set of logs generated by the customer computing resource environment (e.g., during execution of a customer's application). Furthermore, in such embodiments, the set of logs may be modified to include indications of an attack.

In some embodiments, attributes and/or data maintained by the computing resources are modified to protect customer information and/or enable operation of the computing resources outside of the customer computing resource environment. For example, data included in a customer database may be replaced with random data, tracking data, or other data to protect customer data from exfiltration and/or exposure during a simulated attack. In another example, a user account or credentials associated with a particular computing resources is modified to enable an entity other than the customer (e.g., the simulated attack service) to access and/or manage the cloned computing resources. In this manner, alerts, threat analysis information, and other information is directed to an endpoint other than the customer. Note some or all of the steps of process 600 may be performed in various orders such as parallel. For example, once the set of customer computing resource environments are determined, the system executing the process 600 may generate a plurality of cloned computing resources in parallel. In other variations of the process 600, various steps may be omitted. In one example, step 602 is omitted and the process 600 is run continuously.

Figure 7:
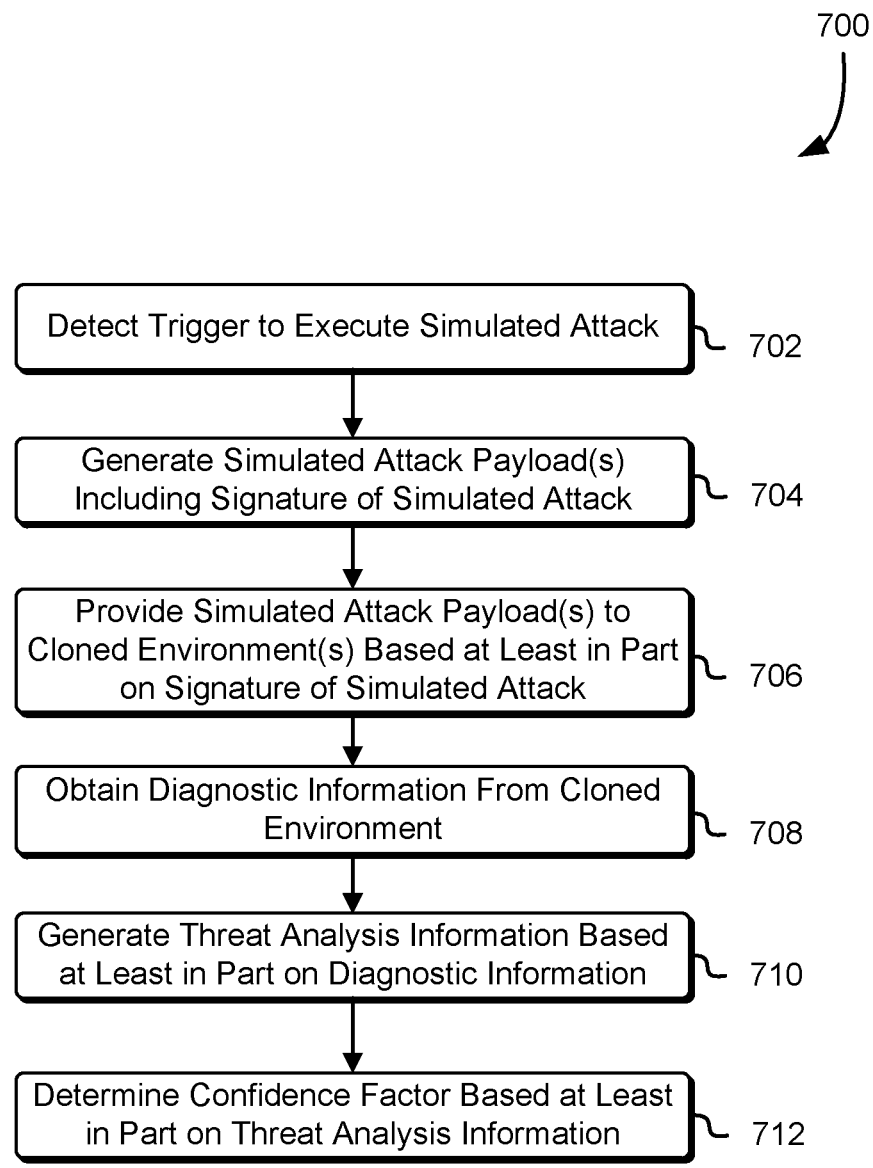
FIG. 7 is a block diagram illustrating a process for performing simulated attack on a cloned computing resource environment to measure the effectiveness of a threat analysis service in accordance with an embodiment.

FIG. 7 is a block diagram illustrating an example of a process 700 for measuring an effectiveness of an intrusion detection system by at least executing a simulated attack on a cloned computing resource environment in accordance with at least one embodiment. Some or all of the process 700 (or any other processes described, or variations and/or combinations of those processes) may be performed under the control of one or more computer systems including executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 700 may be performed by any suitable system, such as a server in a data center, by various components of the environment 300 and 400 described in conjunction with FIGS. 3 and 4 (such as a simulated attack service), by multiple computing devices in a distributed system of a computing resource service provider, or by a service provided by a computing resource service provider. The process 700 includes a series of operations which result in the determining an effectiveness of a threat analysis service to detect a simulated attack within a cloned computing resource environment. For example, the process 700 includes detecting a trigger to execute a simulated attack on a cloned computing resource environment 702. As described above, various triggers may be used for example modification to existing intrusion detection systems, the addition of new intrusion detection systems, a schedule, a request by an administrator or other entity, or some combination thereof.

In step 704, the system executing the process 700 generates a set of simulated attack payloads including a signature of the simulated attack. As described above, the simulated attack payloads may be generated in accordance with a particular simulated attack by a simulated attacker that is a component of the simulated attack service. In one example, simulated payload are generated to execute an exfiltration attack, the simulated payload generate such that when, processed by a computing resources to which the attack is directed, cause the computing resource to provide data to the simulated attacker. In this manner, simulated attack payloads can be generated to simulate any number of different attacks. In addition, the simulated attack payloads include a signature of the simulated attack as described above. In various embodiments, the signature of the attack includes a user agent, session name, identity, role, or policy associated with the simulated attacker. In yet other embodiments, the signature include an HMAC, shared secret, digital signature, metadata, tag, or other information included in the payload.

In step 706, the system executing the process 700 provides the simulated attack payloads to the cloned computing resource environment based at least in part on the signature of the simulated attack. As described above, an ingestion pipeline may be responsible for routing and/or otherwise directing traffic within the computing resource service provider environment. In such embodiments, the ingestion pipeline detects the signature of the simulated attack in the simulated attack payload and, as a result, directs the simulated attack payload to the cloned computing resource environment. In one example, the ingestion pipeline detects a user and/or role associated with the simulated attack payload, where the user and/or role is associated with an action that causes the ingestion pipeline to direct the simulated attack payload to the cloned computing environment. In addition, the simulated attack payload may include a tag as described above. The tag enables the simulated attack service to associated simulated attack payloads with particular simulated attacks and/or cloned computing resource environments.

In step 708, the system executing the process 700 obtains diagnostic information from the cloned computing resource environment. As described above, the threat analysis service may obtain logs and other diagnostic information from various computing resources and/or services associated with the cloned computing resource environment. The diagnostic information, in various embodiments, includes events, results, and other information generated as a result of processing the simulated attacks payloads by the computing resources in the cloned computing resource environment. In yet other embodiments, the diagnostic information is obtained from an intrusion detection system that is in-line with the ingestion pipeline. As an example, the ingestion pipeline includes an intrusion detection system that detects an attempted attack based at least in part on received network traffic and blocks the network traffic associated with the potential attack.

In step 710, the system executing the process 700 generates threat analysis information based at least in part on the diagnostic information. As described above, the threat analysis information may include any information associated with one or more attack detected by the threat analysis service by at least processing the diagnostic information. The threat analysis information may include detected anomalous activity as well as possible anomalous activity. In step 712, the system executing the process 700 determines a confidence factor associated with the threat analysis service based at least in part on the threat analysis information. As described above the threat analysis service may utilize one or more models to detect anomalous activity. As a result, a confidence score may be generated for each detection model used for the overall performance of the threat analysis service. In one example, the confidence factor indicates the false negative rate of the threat analysis service to detect the simulated attacks. In another example, the confidence factor is calculated based at least in part on a number of detected and possible anomalies identified by the threat analysis service as well as any mitigating actions performed by the threat analysis service.

Note some or all of the steps of process 700 may be performed in various orders such as parallel. For example, the process 700 may be executed continuously and as such the system executing the process 700 may be providing simulated attack payloads, obtaining diagnostic information, or determining the confidence factor associated with the threat analysis service in parallel. In other variations of the process 700, various steps may be omitted.

Figure 8:
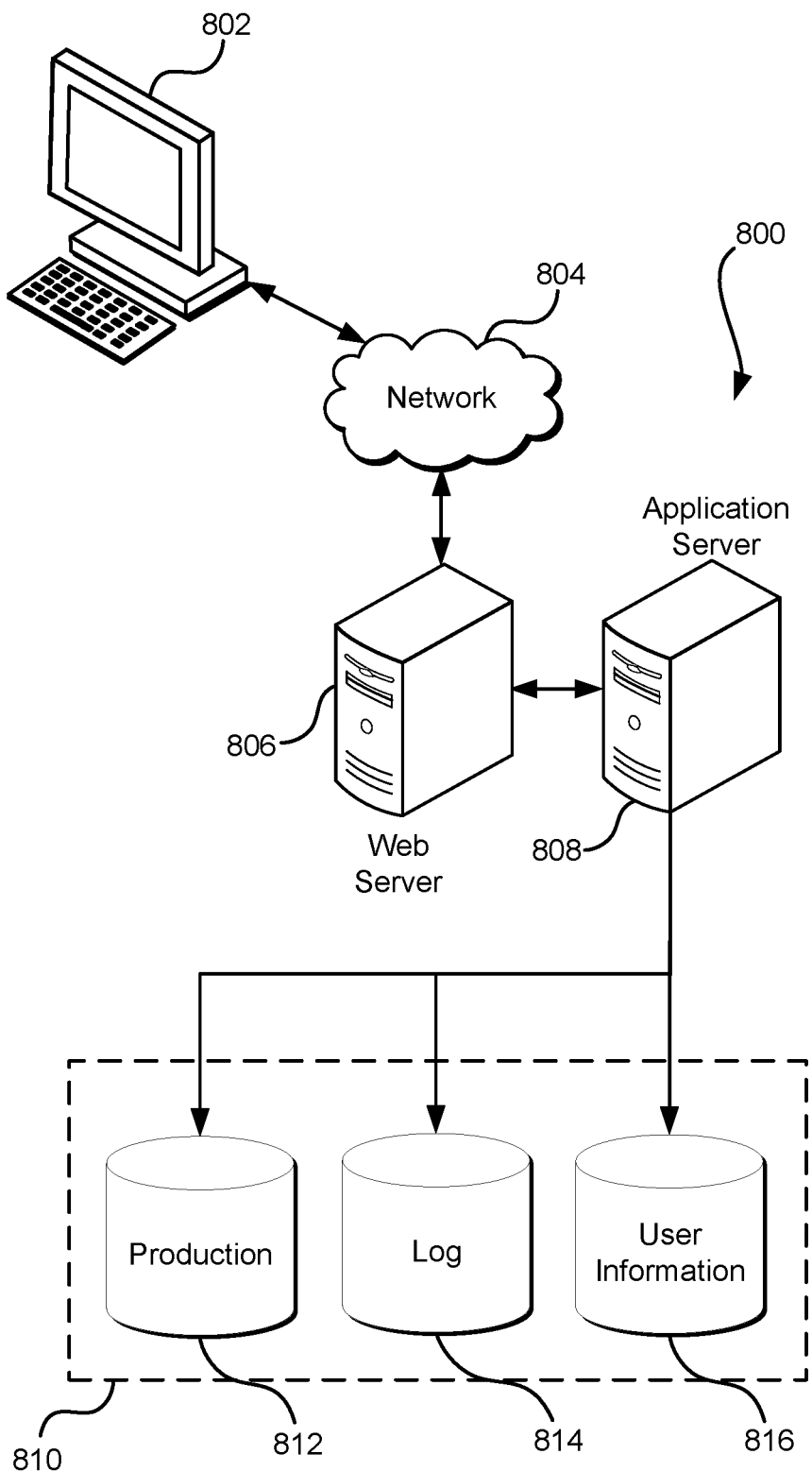
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network, and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual, or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 802 and the application server 808, can be handled by the web server using PHP: HYPERTEXT PREPROCESSOR ("PHP"), PYTHON®, RUBY®, PERL®, JAVA®, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes, and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto.

The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing resource environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as RUBY®, PHP®, PERL®, PYTHON® or TCL®, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    generating a set of cloned computing resource environments based at least in part on metadata associated with a set of computing resource environments provided by a computing resource service provider, the metadata maintained by the computer resource service provider and indicating access information to a set of computing resources operated by a set of customers within the set of computing resource environments, a cloned computing resource environment of the set of cloned computing resource environments containing at least one computing resource modified based at least in part on the metadata;
    generating a set of simulated attack payloads of a simulated attack, a simulated attack payload of the set of simulated attack payloads including a signature indicating the simulated attack and additional metadata to allow a threat analysis service to determine a simulated attack pattern associated with the simulated attack payload and bind the simulated attack payload to the simulated attack by at least differentiating the set of simulated attack payloads from other network traffic;
    transmitting the set of simulated attack payloads;
    causing the set of simulated attack payloads to be distributed to the cloned computing resource environment of the set of cloned computing resource environments based at least in part on the signature;
    obtaining diagnostic information from computing resources of the cloned computing resource environment;
    generating threat analysis information based at least in part on processing the diagnostic information by the threat analysis service based at least in part on the additional metadata; and
    generating a measure of effectiveness of the threat analysis service based at least in part on the threat analysis information and the simulated attack.

2. The computer-implemented method of claim 1, wherein the set of computing resource environments is selected based at least in part on one or more attributes of the set of customers associated with the set of computing resource environments.

3. The computer-implemented method of claim 1, wherein the measure of effectiveness of the threat analysis service includes a false negative rate of the threat analysis service to detect one or more simulated attack payloads of the set of simulated attack payloads of the simulated attack.

4. The computer-implemented method of claim 1, wherein at least one cloned computing resource environment of the set of cloned computing resource environments includes a computing resource provided by a service of the computing resource service provider.

5. A system, comprising:
    one or more processors; and
    memory that stores computer-executable instructions that, as a result of being executed, cause the one or more processors to:
        generate a cloned computing resource environment based at least in part on metadata associated with a set of computing resources included in a computing resource environment provided by a computing resource service provider, the metadata indicates a structure of data maintained by a subset of computing resources of the set of computing resources, where the cloned computing resource environment contains at least one computing resource of the set of computing resources that is modified based at least in part on the metadata associated with the set of computing resources;
        execute a simulated attack by at least:
            generating a set of simulated attack payloads, at least one simulated attack payload of the set of simulated attack payloads including a signature indicating the simulated attack and a tag to allow a threat analysis service to determine a simulated attacker associated with the at least one simulated attack payload, the tag enabling the threat analysis service to differentiate the set of simulated attack payloads from other traffic; and
            transmitting the set of simulated attack payloads;
        obtain threat analysis information generated based at least in part on the threat analysis service processing diagnostic information obtained from the cloned computing resource environment after receiving the at least one simulated attack payload, the threat analysis information indicating the at least one simulated attack payload is associated with the simulated attacker based at least in part on the tag included in the at least one simulated attack payload; and
        generate a measure of effectiveness of the threat analysis service based at least in part on a comparison of the threat analysis information and the set of simulated attack payloads.

6. The system of claim 5, wherein computer-executable instructions that cause the one or more processors to transmit the set of simulated attack payloads further includes computer-executable instructions that, as a result of being executed, cause the one or more processors to transmit the set of simulated attack payloads to an interface of the computing resource service provider, the interface directing the set of simulated attack payloads to the cloned computing resource environment based at least in part on the signature.

7. The system of claim 5, wherein the signature includes a user agent associated with at least one simulated attack payload of the set of simulated attack payloads.

8. The system of claim 5, wherein the signature includes a role associated with at least one simulated attack payload of the set of simulated attack payloads.

9. The system of claim 5, wherein the memory further includes computer-executable instructions that, as a result of being executed, cause the one or more processors to detect a trigger to execute the simulated attack, the trigger generated based at least in part on a modification to a model utilized by the threat analysis service.

10. The system of claim 5, wherein the memory further includes computer-executable instructions that, as a result of being executed, cause the one or more processors to provide the measure of effectiveness of the threat analysis service to a user associated with the computing resource environment.

11. The system of claim 5, wherein the memory further includes computer-executable instructions that, as a result of being executed, cause the one or more processors to provide a suggested modification to the computing resource environment based at least in part on the measure of effectiveness of the threat analysis service.

12. The system of claim 5, wherein computer-executable instructions that cause the one or more processors to generate the cloned computing resource environment further include computer-executable instructions that, as a result of being executed, cause the one or more processors to modify a set of permissions associated with the at least one computing resource of the set of computing resources.

13. A non-transitory computer-readable storage medium storing thereon executable instructions that, as a result of being executed by one or more processors of a computer system, cause the computer system to at least:
generate a cloned computing resource environment based at least in part on first metadata associated with a set of computing resources included in a computing resource environment, the first metadata obtained from a computing resource service provider, indicating credential information for accessing computing resources of the set of computing resources, and comprising a set of logs generated by the set of computing resources, where the set of logs are modified to include an indication of a simulated attack payload;
generate the simulated attack payload of a simulated attack, the simulated attack payload including second metadata used to determine that the simulated attack payload is associated with the simulated attack and directed to the cloned computing resource environment based at least in part on a signature included in the simulated attack payload, where the signature allows the computer system to differentiate the simulated attack payload from other network traffic; and
determine a measure of effectiveness of an intrusion detection system by at least:
obtaining threat analysis information generated by the intrusion detection system based at least in part on the simulated attack, the threat analysis information indicating that the simulated attack payload is associated with the simulated attack based at least in part on the second metadata including the signature; and
comparing information associated with the simulated attack and the threat analysis information.

14. The non-transitory computer-readable storage medium of claim 13, wherein the instructions that cause the computer system to generate the cloned computing resource environment further include instructions that cause the computer system to instantiate a virtual machine instance based at least in part on an image of at least one computing resource of the set of computing resources included in the computing resource environment.

15. The non-transitory computer-readable storage medium of claim 13, wherein the instructions further comprise instructions that, as a result of being executed by the one or more processors, cause the computer system to determine to clone the computing resource environment based at least in part on a number of computing resources included in the set of computing resources.

16. The non-transitory computer-readable storage medium of claim 13, wherein the instructions further comprise instructions that, as a result of being executed by the one or more processors, cause the computer system to update the cloned computing resource environment based at least in part on the computing resource environment as a result of the simulated attack.

17. The non-transitory computer-readable storage medium of claim 13, wherein the measure of effectiveness further comprises a latency of the intrusion detection system to detect the simulated attack payload of the simulated attack.

18. The non-transitory computer-readable storage medium of claim 13, wherein the measure of effectiveness further comprises a measure of the intrusion detection system identifying an appropriate severity associated with the simulated attack payload.

19. The non-transitory computer-readable storage medium of claim 13, wherein the instructions that cause the system to generate the cloned computing resource environment further comprise instructions that, as a result of being executed by the one or more processors, cause the computer system to modify a set of permissions associated with the cloned computing resource environment.

20. The non-transitory computer-readable storage medium of claim 19, wherein the set of permissions further comprises a permission of the set of permissions that, as a result of being enforced by an interface, causes requests associated with the second metadata to be directed to the cloned computing resource environment.

* * * * *